US011507582B2

United States Patent
Wright et al.

(10) Patent No.: US 11,507,582 B2
(45) Date of Patent: Nov. 22, 2022

(54) EVENT-DRIVEN INTERNET OF THINGS (IOT) ABSTRACTION USING RULES

(71) Applicant: Charter Communications Operating, LLC, St. Louis, MO (US)

(72) Inventors: Ethan Wright, Denver, CO (US); Micah Labbee, Aurora, CO (US); Jason Page, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 166 days.

(21) Appl. No.: 17/116,694

(22) Filed: Dec. 9, 2020

(65) Prior Publication Data

US 2022/0181037 A1 Jun. 9, 2022

(51) Int. Cl.
*G06F 16/2455* (2019.01)
*G16Y 40/35* (2020.01)
*G16Y 40/10* (2020.01)
*H04W 4/80* (2018.01)
*H04W 84/18* (2009.01)

(52) U.S. Cl.
CPC ........ *G06F 16/24564* (2019.01); *G16Y 40/10* (2020.01); *G16Y 40/35* (2020.01); *H04W 4/80* (2018.02); *H04W 84/18* (2013.01)

(58) Field of Classification Search
None
See application file for complete search history.

(56) References Cited

U.S. PATENT DOCUMENTS

| | | | |
|---|---|---|---|
| 2016/0112240 A1* | 4/2016 | Sundaresan | H04W 4/90 726/1 |
| 2017/0041304 A1* | 2/2017 | Tai | H04W 12/08 |
| 2017/0054810 A1* | 2/2017 | Evans | H04L 41/145 |
| 2017/0063968 A1* | 3/2017 | Kitchen | H04L 65/1033 |
| 2019/0095520 A1* | 3/2019 | Park | G06F 16/2358 |
| 2019/0342178 A1* | 11/2019 | Balasubramanian | G06N 5/00 |
| 2021/0067591 A1* | 3/2021 | Ly | H04W 4/38 |

* cited by examiner

*Primary Examiner* — Walter J Divito
(74) *Attorney, Agent, or Firm* — Dority & Manning, P.A.

(57) ABSTRACT

Event-driven Internet of Things (IoT) abstraction using rules is disclosed herein. In one embodiment, a network computing device that provides an IoT management (IoTM) service is communicatively coupled to an IoT device. The IoTM service receives multiple rules, each of which comprises an event identifier that identifies an event that the IoT device is capable of emitting, and an action identifier that identifies an action to be performed by the IoTM service (e.g., a command to be issued to the IoT device or an operation to be performed by the IoTM service). Upon receiving a first event emitted by the IoT device, the IoTM service identifies a first rule of the plurality of rules based on a first event identifier of the first rule that matches the first event. The IoTM service then executes a first action, wherein a first action identifier of the first rule identifies the first action.

20 Claims, 7 Drawing Sheets

FIG. 1

| RULE 22(0) | | | | |
|---|---|---|---|---|
| RULE IDENTIFIER (44(0)) | IoT DEVICE FILTER (46(0)) | PLUGIN IDENTIFIER (48(0)) | EVENT IDENTIFIER (40(0)) | ACTION IDENTIFIER (42(0)) |

• • •

| RULE 22(R) | | | | |
|---|---|---|---|---|
| RULE IDENTIFIER (44(R)) | IoT DEVICE FILTER (46(R)) | PLUGIN IDENTIFIER (48(R)) | EVENT IDENTIFIER (40(R)) | ACTION IDENTIFIER (42(R)) |

EVENT-DRIVEN INTERNET OF THINGS (IOT) ABSTRACTION USING RULES

BACKGROUND

The Internet of Things (IoT) refers generally to network-enabled devices (excluding conventional computers such as server computers, desktop computers, and laptop computers) that use embedded sensors, software, and/or network connections to connect and exchange data with other devices and systems over networks such as the internet. IoT devices may employ network connections such as those provided by WiFi, near-field communication (NFC), and other wireless links, and may communicate with other devices using protocols such as BLUETOOTH®, Bluetooth Low Energy (BLE), ZIGBEE®, and Z-WAVE®, as non-limiting examples.

SUMMARY

The embodiments disclosed herein perform event-driven Internet of Things (IoT) abstraction using rules. Accordingly, in some embodiments, a network computing device includes an IoT management (IoTM) service that receives a set of rules that each specify an event that may be emitted by an IoT device, as well as one or more corresponding actions that the IoTM service may perform in response to the event. Upon receiving an event corresponding to one of the rules from an IoT device, the IoTM service performs the corresponding action (e.g., by sending a command to the IoT device, or by uploading data received from the IoT device, as non-limiting examples). In this manner, the IoTM service acts as an abstraction layer that enables the network computing device to perform event-based interactions with IoT devices based on the provided rules.

In another embodiment, a method is provided. The method comprises receiving, by an IoTM service of a network computing device, a plurality of rules, wherein the network computing device is communicatively coupled to an IoT device, and each rule of the plurality of rules comprises an event identifier that identifies an event that the IoT device is capable of emitting and an action identifier that identifies an action to be performed by the IoTM service. The method further comprises receiving, by the IoTM service, a first event emitted by the IoT device. The method also comprises identifying a first rule of the plurality of rules based on a first event identifier of the first rule that matches the first event. The method additionally comprises executing, by the IoTM service, a first action, wherein a first action identifier of the first rule identifies the first action.

In another embodiment, a network computing device is provided. The network computing device comprises a system memory, and a processor device communicatively coupled to the system memory and to an IoT device. The processor device is configured to receive, by an IoTM service of the processor device, a plurality of rules, wherein each rule of the plurality of rules comprises an event identifier that identifies an event that the IoT device is capable of emitting, and an action identifier that identifies an action to be performed by the IoTM service. The processor device is further configured to receive a first event emitted by the IoT device. The processor device is also configured to identify a first rule of the plurality of rules based on a first event identifier of the first rule that matches the first event. The processor device is additionally configured to execute a first action, wherein a first action identifier of the first rule identifies the first action.

In another example, a computer program product is provided. The computer program product is stored on a non-transitory computer-readable storage medium, and includes computer-executable instructions that, when executed, cause a processor device of a computing device to receive, by an IoTM service of the processor device, a plurality of rules, wherein each rule of the plurality of rules comprises an event identifier that identifies an event that the IoT device is capable of emitting and an action identifier that identifies an action to be performed by the IoTM service. The computer-executable instructions further cause the processor device to receive a first event emitted by the IoT device. The computer-executable instructions also cause the processor device to identify a first rule of the plurality of rules based on a first event identifier of the first rule that matches the first event. The computer-executable instructions additionally cause the processor device to execute a first action, wherein a first action identifier of the first rule identifies the first action.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As noted above, the term "Internet of Things (IoT)" and derivatives thereof are used herein to refer generally to network-enabled devices (excluding conventional computers such as server computers, desktop computers, and laptop computers) that use embedded sensors, software, and/or network connections to connect and exchange data with other devices and systems over networks such as the internet. IoT devices may employ network connections such as those provided by WiFi, near-field communication (NFC), and other wireless links, and may communicate with other devices using protocols such as BLUETOOTH®, Bluetooth Low Energy (BLE), ZIGBEE®, and Z-WAVE®, as non-limiting examples. The proliferation of IoT devices within homes and businesses has expanded the possibilities for task automation and tracking of personal and business data and activity. However, conventional approaches for managing IoT devices lack a common mechanism for flexibly controlling interactions with IoT devices, facilitating communications between IoT devices and other network devices, and coordinating operations performed by IoT devices.

In this regard, embodiments disclosed herein perform event-driven IoT abstraction using rules. In one embodiment, a network computing device (e.g., a multiple-system operator (MSO) managed wireless router or an MSO managed wired router, as non-limiting examples) is communicatively coupled to an IoT device, such that the network computing device can receive events emitted by the IoT device and issue commands to the IoT device. The network computing device includes an IoT management (IoTM) service that comprises an event-driven framework for controlling interactions with IoT devices using rules. The IoTM service first receives a set of rules, each of which identifies both an event that the IoT device is capable of emitting and a corresponding action to be performed responsive to that event (e.g., a command to be issued to the IoT device by the IoTM service, or an operation to be executed by the IoTM service, as non-limiting examples). In some embodiments, the rules may be received by the IoTM service from a third-party rules provider, such as a provider of the IoT device. When the IoTM service receives an event emitted by the IoT device, the IoTM service identifies a rule associated with that event, and then executes the corresponding action. Some embodiments may further provide that each rule may also specify an IoT device filter that may be used to match any attribute exposed by an IoT device, and thus may identify one or more IoT devices to which the rule applies. In this manner, an IoT application defined by a set of rules can control interactions between the network computing device and the IoT device.

In some embodiments, the network computing device may provide a plugin that supports a communications protocol for communication with the IoT device. The communications protocol supported by the plugin may include, as non-limiting examples, BLUETOOTH®, BLE, ZIGBEE®, or Z-WAVE®. The plugin according to some embodiments may be provided as an integral part of the IoTM service of the network computing device, or may comprise executable code that is received by the network computing device from, e.g., a third-party plugin provider. In such embodiments, the plugin, acting as an abstraction layer between the IoTM service and the IoT device, receives the event emitted by the IoT device, and sends the event to the IoTM service for processing. Similarly, the IoTM service in such embodiments may issue a command for the IoT device to the plugin, which then forwards the command to the IoT device. According to some embodiments, a rule may identify a particular plugin to which the command should be directed. The use of the plugin thus provides a more flexible coupling between the IoTM service and the IoT device, and allows the IoTM service itself to remain agnostic with respect to communications protocols used by different IoT device.

Figure 1:
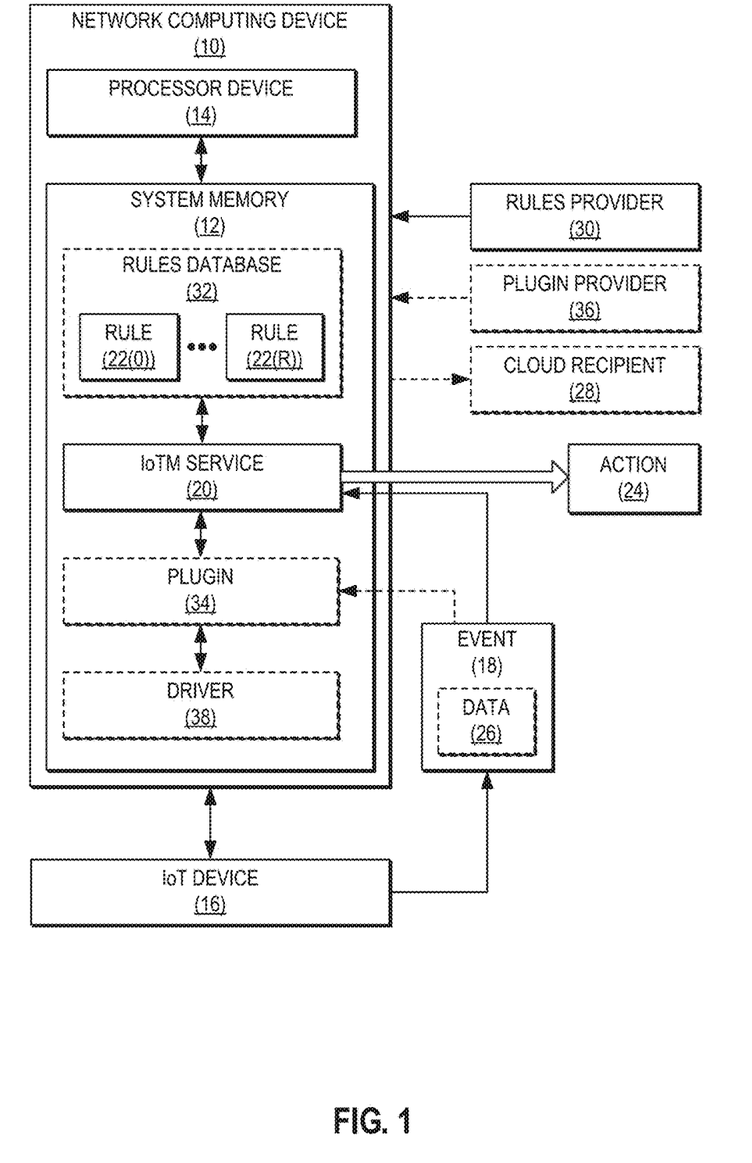
FIG. 1 is a block diagram illustrating an exemplary network computing device configured to perform event-driven Internet of Things (IoT) abstraction using rules, in accordance with some embodiments.

FIG. 1 is a block diagram illustrating an exemplary network computing device 10 that may be utilized to perform event-driven IoT abstraction using rules. The network computing device 10 in FIG. 1 comprises a system memory 12 and a processor device 14 that is communicatively coupled to the system memory 12. The network computing device 10 in some embodiments may comprise a MSO managed wireless router or an MSO managed wired router, as non-limiting examples. The network computing device 10 of FIG. 1 and the constituent elements thereof may encompass any one of known digital logic elements, semiconductor circuits, processing cores, and/or memory structures, among other elements, or combinations thereof. Examples described herein are not restricted to any particular arrangement of elements, and it is to be understood that some embodiments of the network computing device 10 may include more or fewer elements than illustrated in FIG. 1. For example, the processor device 14 may further include one or more functional units, instruction caches, unified caches, memory controllers, interconnect buses, and/or additional memory devices, caches, and/or controller circuits, which are omitted from FIG. 1 for the sake of clarity.

The processor device 14 of FIG. 1 is communicatively coupled to an IoT device 16 via a suitable communications interface (not shown). Accordingly, processes that are resident in the system memory 12 and that are being executed by the processor device 14 can receive events emitted by the IoT device 16 (such as an event 18), and further can issue commands to the IoT device 16. The IoT device 16 may comprise, as non-limiting examples, a network-enabled "smart" device such as an appliance, a speaker, a thermostat, a light, a switch, a home automation controller, or a lock. The term "event" and derivatives thereof are used herein to refer to a message transmitted from the IoT device 16 to the processor device 14 to indicate an occurrence that may be handled by the processor device 14 itself or by a process executing thereon. Events may include, but are not limited to, error indications, advertisement indications (i.e., messages by which the IoT device 16 announces its presence for discovery by other devices), connection indications, discovery indications (i.e., messages by which the IoT device 16 indicates its detection of other devices), and status indications.

To manage interactions with the IoT device 16, the processor device 14 executes an IoTM service 20 to provide a framework for detecting events and carrying out responsive actions based on rules. The IoTM service 20 may be implemented as a dedicated IoTM service circuit, as microcode in firmware, or as a software process executed by the processor device 14. Interactions between the IoTM service 20 and the IoT device 16 are governed by a set of rules 22(0)-22(R). Each of the rules 22(0)-22(R) specifies, at a minimum, an event identifier (not shown) that identifies an event (e.g., the event 18) emitted by the IoT device 16, and an action identifier (not shown) that identifies an action 24 to be performed by the IoTM service 20 responsive to receiving the corresponding event 18.

The action identifier may comprise a command to be issued to the IoT device 16 by the IoTM service 20 (e.g., directly or using a plugin, as discussed below in greater detail), or may comprise an operation to be carried out by the IoTM service 20 (e.g., executed by the IoTM service 20 itself, or by a plugin used by the IoTM service 20). As a non-limiting example of an operation to be carried out by the IoTM service 20, the action indicator may comprise a command to cause the IoTM service to send data 26 provided by the event 18 to a plugin for uploading to a cloud recipient 28 (i.e., an entity that receives data uploaded by the IoTM service 20 via a private or public network in response to an event emitted by the IoT device 16). The plugin, in turn, would parse the data 26 and upload the data 26 to the cloud recipient 28, using, e.g., an application programming interface (API) provided by the IoTM service 20. The rules 22(0)-22(R) in some embodiments may also include, e.g., an IoT identifier (not shown) that identifies a particular IoT device (e.g., the IoT device 16) to which the rules 22(0)-22(R) apply. Exemplary contents of the rules 22(0)-22(R) according to some embodiments are illustrated and discussed in greater detail below with respect to FIG. 2.

In the example of FIG. 1, the rules 22(0)-22(R) are received by the IoTM service 20 from a rules provider 30 via a private or public network, and are stored in a rules database 32. The rules provider 30 in some embodiments may be a provider of the IoT device 16 to which the rules 22(0)-22(R) apply. As a non-limiting example, a doctor's office may provide a patient with a BLUETOOTH®-enabled blood pressure monitor (i.e., an IoT device) for use in the patient's home. The doctor's office may also provide rules (e.g., the rules 22(0)-22(R)) to enable the IoTM service 20 to perform operations in response to events emitted by the blood pressure monitor. For instance, one of the rules may be triggered by the blood pressure monitor emitting an event indicating that a blood pressure measurement has been taken, and, in response, the IoTM service 20 may upload the blood pressure measurement to the doctor's office or another cloud recipient such as the cloud recipient 28. Exemplary interactions between the IoTM service 20, the IoT device 16, and other entities are illustrated and discussed in greater detail below with respect to FIG. 3.

In some embodiments, the IoTM service 20 may employ a plugin 34 to more flexibly couple the IoTM service 20 to the IoT device 16 by avoiding the need to hardcode support for the IoT device 16 into the IoTM service 20. The plugin 34 in the example of FIG. 1 is executable code that provides an interface layer that supports a communications protocol (e.g., BLUETOOTH®, BLE, ZIGBEE®, or Z-WAVE®, as non-limiting examples) for communication with the IoT device 16. The plugin 34 may be provided or preinstalled on the network computing device 10, or may be received by the IoTM service 20 from a plugin provider 36 via a private or public network. The plugin provider 36 may be the same entity as the rules provider 30 and/or the cloud recipient 28 in some embodiments.

Some embodiments may provide that the plugin 34 communicates directly with the IoT device 16, while the plugin 34 in some embodiments may communicate with a driver 38 or other intervening software layer between the plugin 34 and the IoT device 16. When employing the plugin 34, the IoTM service 20 may not receive the event 18 directly from the IoT device 16. Instead, the plugin 34 receives the event 18 from the IoT device 16, and then sends the event 18 to the IoTM service 20. Similarly, the IoTM service 20 may not issue a command directly to the IoT device 16, but rather may issue a command to the plugin 34, which then forwards the command to the IoT device 16. In some embodiments, a rule of the rules 22(0)-22(R) corresponding to the event 18 may include a plugin identifier (not shown) that specifies the plugin 34 as the recipient of the command. The plugin 34 may communicate with the IoT device 16 and the IoTM service 20 using any appropriate conventional mechanisms, such as using dynamically loaded code to publish supported commands and events and/or using shared pointers to pass data between the plugin 34 and the IoT device 16 or the IoTM service 20.

Figure 2:
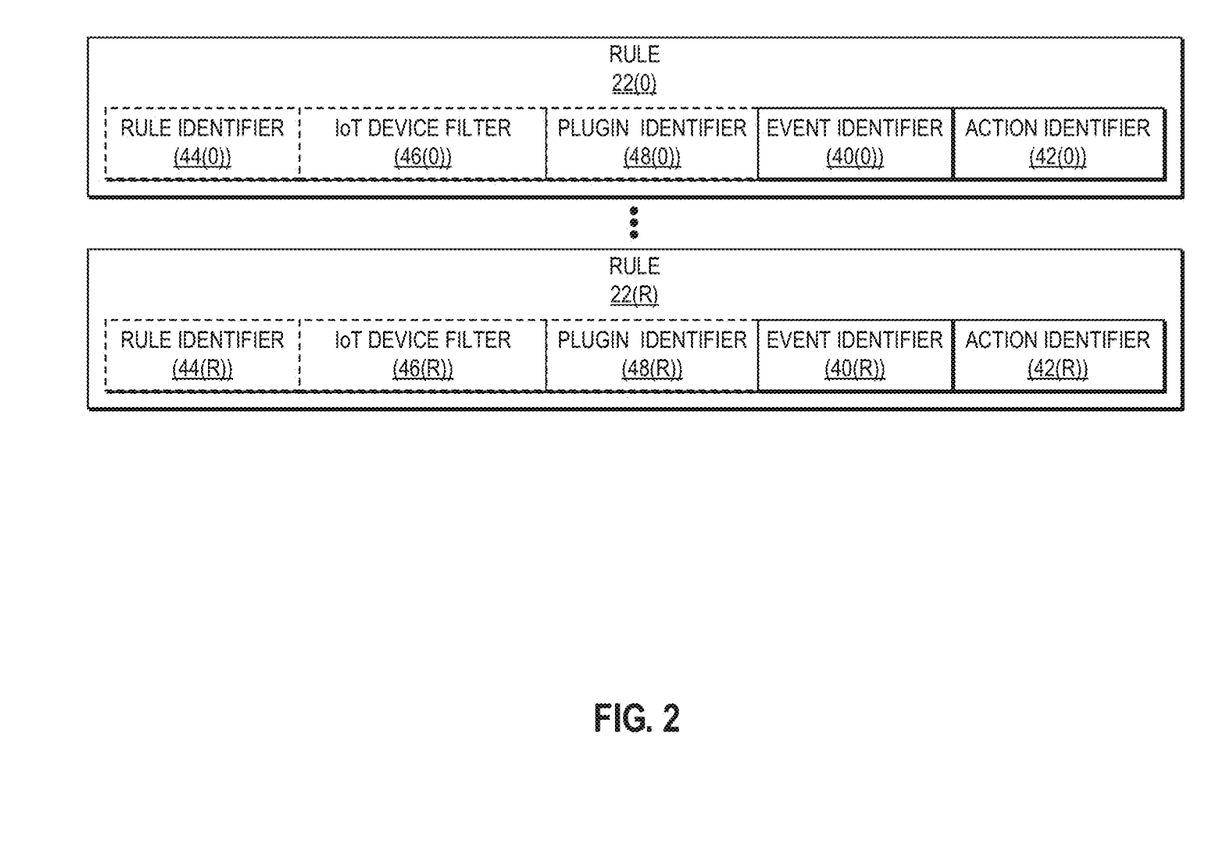
FIG. 2 is a block diagram illustrating exemplary contents of the rules of FIG. 1, in accordance with some embodiments.

To illustrate exemplary contents of the rules 22(0)-22(R) of FIG. 1 according to some embodiments, FIG. 2 is provided. As seen in FIG. 2, the rules 22(0)-22(R) include corresponding event identifiers 40(0)-40(R) that each identify an event, such as the event 18 of FIG. 1, that the IoT device 16 is capable of emitting. Thus, in embodiments in which the IoT device 16 communicates using the BLE protocol, the event identifiers 40(0)-40(R) each may comprise text that specifies a BLE event, such as "ble_advertised," "ble_connected," "ble_serv_discovered," or "ble_char_discovered," as non-limiting examples, that may be emitted by the IoT device 16.

The rules 22(0)-22(R) also include corresponding action identifiers 42(0)-42(R), each of which identifies an action to be performed by the IoTM service 20 in response to the event identified by the corresponding event identifier 40(0)-40(R). In the example referenced above directed to the IoT device 16 that supports the BLE protocol, the action identifiers 42(0)-22(R) may each comprise text that specifies a command to the IoT device 16, such as "ble_connect_device," "ble_discover_services," or "ble_discover_characteristics," as non-limiting examples. Some embodiments may provide that a single action identifier of the action identifiers 42(0)-42(R) may specify multiple actions to be carried out by the IoTM service 20 in response to a single event emitted by the IoT device 16.

In some embodiments, the rules 22(0)-22(R) may also provide additional data to facilitate processing of the rules by the IoTM service 20. For example, some embodiments may provide that the rules 22(0)-22(R) include corresponding rule identifiers 44(0)-44(R) to indicate, e.g., labels or names by which the rules 22(0)-22(R) may be referred. According to some embodiments, the rules 22(0)-22(R) include IoT device filters 46(0)-46(R) that each may identify one or more IoT devices (such as the IoT device 16) to which the rule applies. The IoT device filters 46(0)-46(R) each may comprise a filter that wholly or partially matches an attribute exposed by an IoT device (e.g., an identifier such as a Media Access Control (MAC) address or a Universally Unique Identifier (UUID), or a status indication such as battery level indicator or other status indicator, as non-limiting example). The IoT device filters 46(0)-46(R) may be particularly useful in scenarios in which an event identified by an event identifier 40(0)-40(R) of the rules 22(0)-22(R) may be emitted by more than one IoT device. Similarly, each of the rules 22(0)-22(R) in some embodiments may include a corresponding plugin identifier 48(0)-48(R) that identifies a specific plugin (e.g., the plugin 34 of FIG. 1) to handle an event and/or an action specified by the rule 22(0)-22(R).

The rules 22(0)-22(R) may be specified in any format suitable for a given implementation of the IoTM service 20. For instance, some embodiments may provide that the rules 22(0)-22(R) are defined in a manner similar to conventional firewall rules. Table 1 below illustrates contents of an exemplary rule. In this example, the rule includes a "name" parameter that corresponds to the rule identifiers 44(0)-44(R) of FIG. 2, an "event" parameter that corresponds to the event identifiers 40(0)-40(R) of FIG. 2, a "filter" parameter that corresponds to the IoT device filters 46(0)-46(R) of FIG. 2, and an "actions" parameter that corresponds to the action identifiers 42(0)-42(R) of FIG. 2.

TABLE 1

```
# Device Rules
ovsh U IOT_Rule_Config -w name=="connect_to_bp_cuff" \
    name:="connect_to_bp_cuff" \
    event:="ble_advertised" \
    filter:='["map",[["mac","${dev_ble_mac}"]]]' \
    actions:='["map",[["dev_ble_default","ble_connect_device"]]]' \
```

Figure 3A:
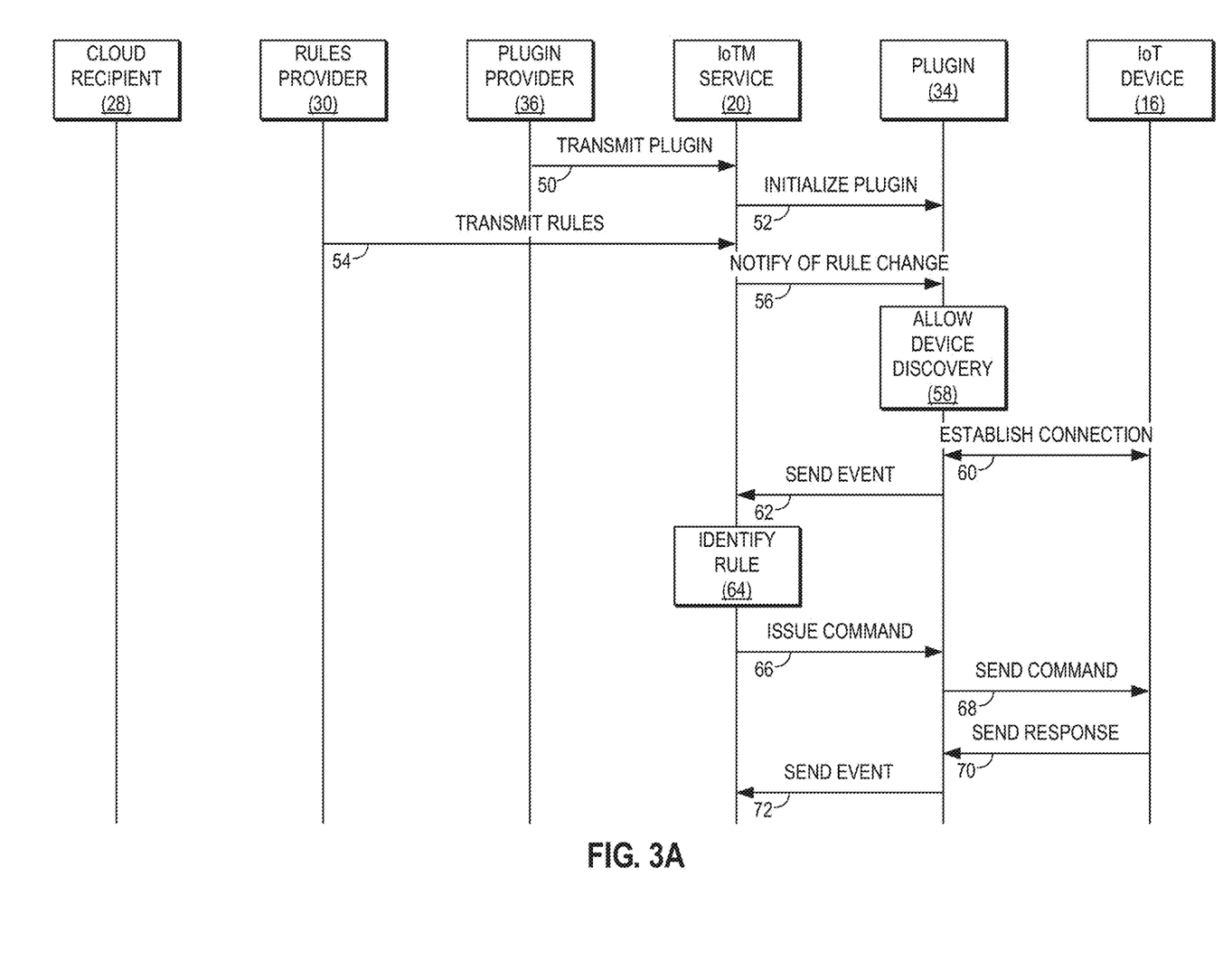
FIGS. 3A and 3B are a message sequence diagram illustrating messages sent and operations performed when performing event-driven IoT abstraction using rules, in accordance with some embodiments.
Figure 3B:
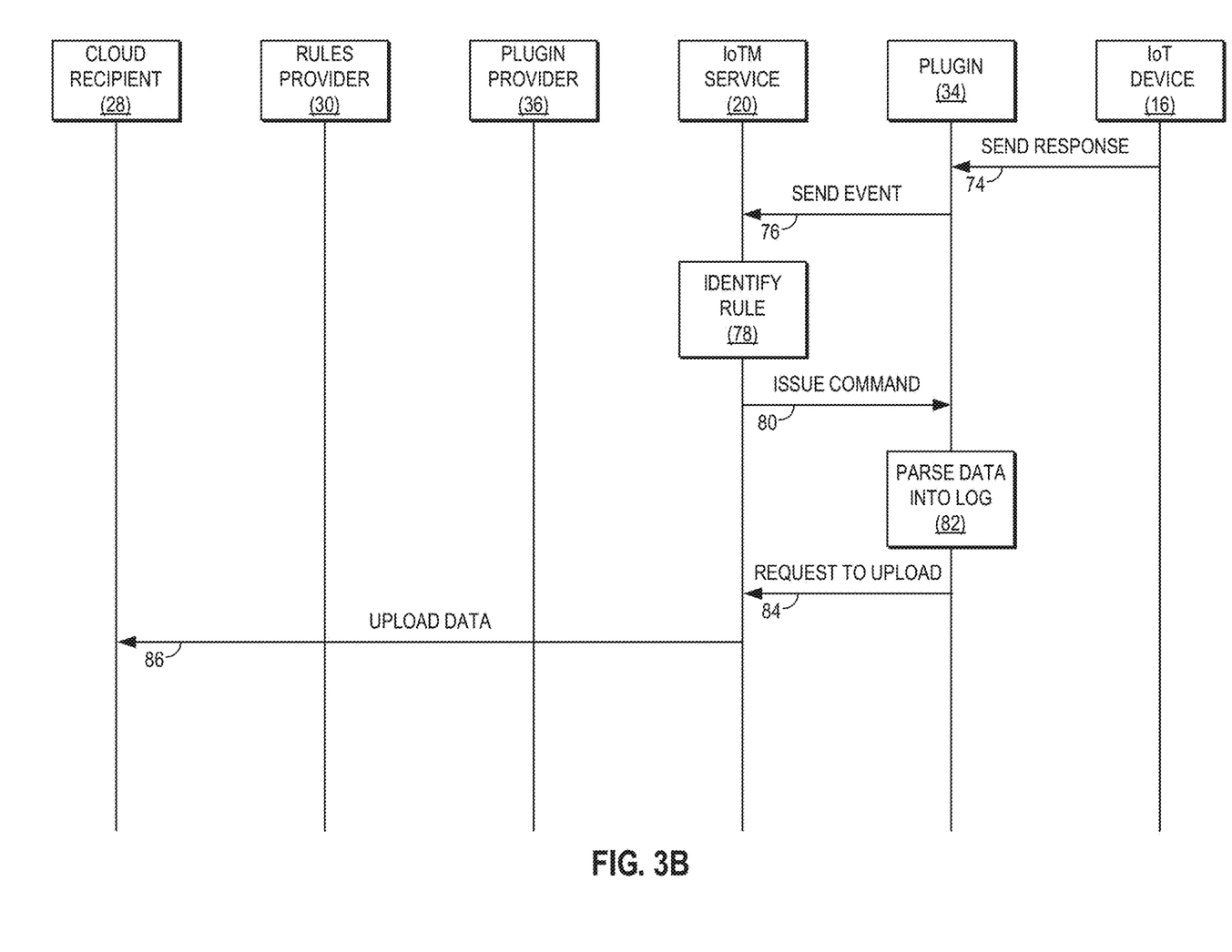

To illustrate messages sent and operations performed in providing event-driven IoT abstraction using rules in accordance with some embodiments, FIGS. 3A and 3B are provided. In FIGS. 3A and 3B, elements of FIG. 1, including the cloud recipient 28, the rules provider 30, the plugin provider 36, the IoTM service 20, the plugin 34, and the IoT device 16, are represented by vertical lines. Communications between the illustrated elements are represented by numbered arrows between the corresponding vertical lines, while operations performed by the illustrated elements are represented by numbered blocks. It is to be understood that, in some embodiments, the communications and operations illustrated herein may be performed in an order other than that shown in FIGS. 3A and 3B, and/or may be omitted.

In FIG. 3A, operations begin with the plugin provider 36 transmitting a plugin, such as the plugin 34, to the IoTM service 20 for use in interacting with the IoT device 16, as indicated by arrow 50. Upon receiving the plugin 34, the IoTM service 20 initializes the plugin 34, as indicated by arrow 52. Initialization of the plugin 34 may include installing the plugin 34 on the network computing device 10, and performing any necessary operations for placing the plugin 34 in an initial state to begin processing events emitted from the IoT device 16 and commands issued by the IoTM service 20. The rules provider 30 next transmits rules, such as the rules 22(0)-22(R) of FIGS. 1 and 2, to the IoTM service 20, as indicated by arrow 54. As described above, the rules 22(0)-22(R) may define a series of events and corresponding actions that together constitute an IoT application to be executed by the IoTM service 20 for interacting with the IoT device 16.

In response to receiving the rules 22(0)-22(R), the IoTM service 20 notifies the plugin 34 of rule changes, as indicated by arrow 56. The plugin 34 next places itself into a mode allowing device discovery (e.g., to discover IoT devices such as the IoT device 16), as indicated by box 58. The plugin 34 and the IoT device 16 then establish a connection, as indicated by arrow 60. In response to establishing a connection with the IoT device 16, the plugin 34 sends an event to the IoTM service 20, as indicated by arrow 62. The event that the plugin 34 sends to the IoTM service 20 may comprise data received from the IoT device 16, or may comprise such data translated into a format compatible with the IoTM service 20. The IoTM service 20 next identifies a rule of the rules 22(0)-22(R) that corresponds to the event received from the IoT device 16 via the plugin 34, as indicated by block 64. This may be accomplished by identifying one or more rules of the rules 22(0)-22(R) having an event identifier 40(0)-40(R) that matches the event.

The IoTM service 20 then executes an action that is indicated by the action identifier 42(0)-42(R) of the identified rule. In the example of FIG. 3A, the action identifier 42(0)-42(R) identifies a command to be issued by the IoTM service 20 to the IoT device 16. Accordingly, the IoTM service 20 may issue the command to the plugin 34, as indicated by arrow 66. The plugin 34 then sends the command to the IoT device 16, as indicated by arrow 68. Upon executing the command, the IoT device 16 sends a response to the plugin 34 (i.e., to indicate an outcome of executing the command, as a non-limiting example), as indicated by arrow 70. The plugin 34 sends a corresponding event to the IoTM service 20, as indicated by arrow 72. Operations in some examples then continue in FIG. 3B.

Referring now to FIG. 3B, the IoT device 16 in this example emits another event (e.g. the event 18 of FIG. 1), which is received by the plugin 34, as indicated by arrow 74. The plugin 34 then sends the event to the IoTM service 20, as indicated by arrow 76, and the IoTM service 20 identifies a rule of the rules 22(0)-22(R) that corresponds to the event, as indicated by block 78. In this example, the corresponding rule includes an action identifier that indicates that data is to be uploaded to the cloud recipient 28. Accordingly, the IoTM service 20 issues a command to perform the upload to the plugin 34, as indicated by arrow 80. The plugin 34 parses data (e.g., the data 26 of FIG. 1) to be uploaded into a log, as indicated by block 82, and then issues a request to the IoTM service 20 to upload the data (e.g., using an API of the IoTM service 20, as a non-limiting example), as indicated by arrow 84. Finally, the IoTM service 20 uploads the data to the cloud recipient 28, as indicated by arrow 86.

It is to be understood that, for a given set of rules 22(0)-22(R), the operations illustrated in FIG. 3 for emitting the event 18, identifying a corresponding rule 22(0)-22(R), and carrying out the associated action may be repeated for multiple events during operation of the network computing device 10 and the IoT device 16. For example, a first action performed by the IoTM service 20 in response to a first event may in turn trigger the IoT device 16 to emit a second event, which then causes a second action to be performed by the IoTM service 20, and so forth in like fashion. In this manner, the rules 22(0)-22(R) can define complex interactions between the IoTM service 20 and the IoT device 16.

Figure 4A:
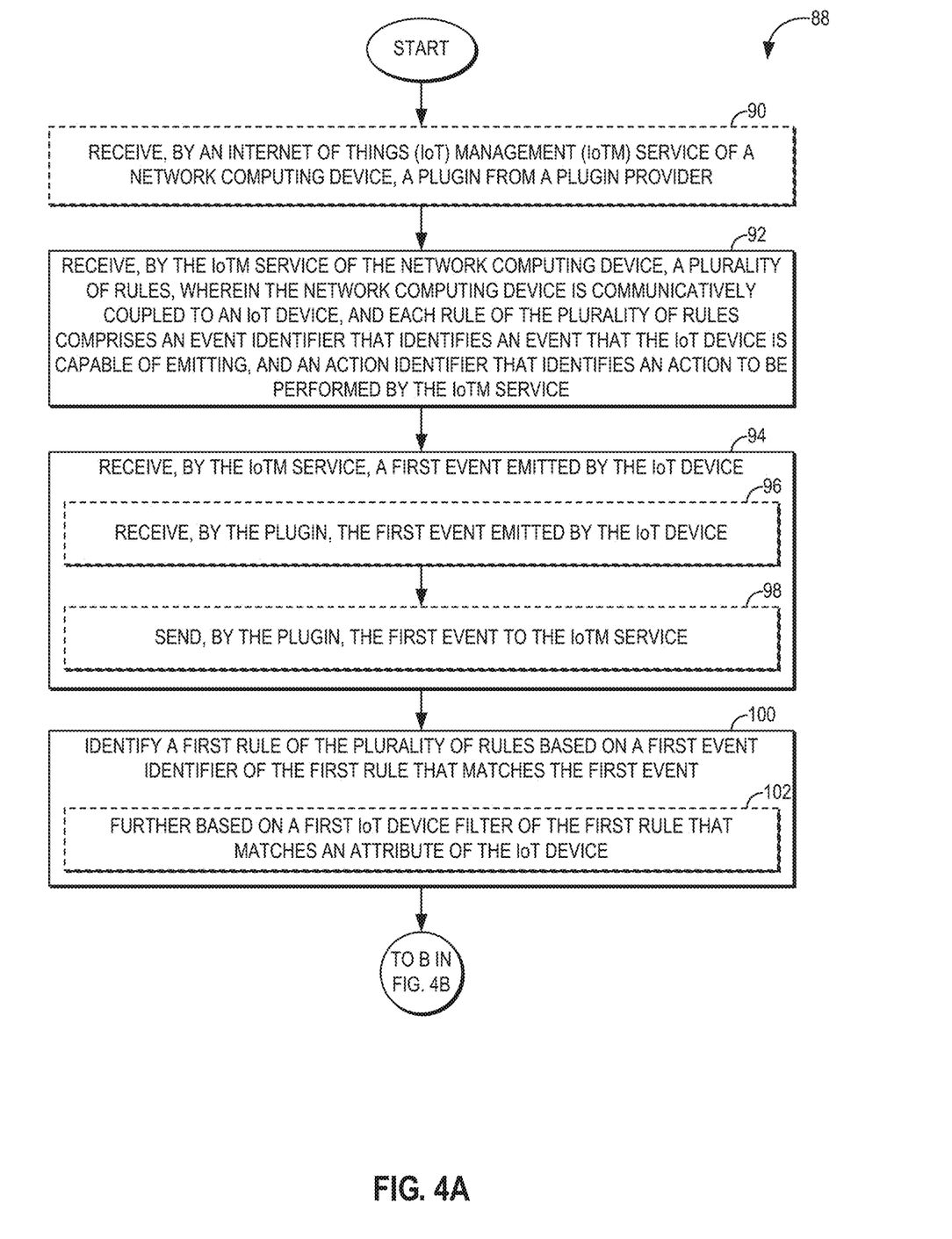
FIGS. 4A and 4B are flowcharts illustrating exemplary operations of the network computing device of FIG. 1 for performing event-driven IoT abstraction using rules, in accordance with some embodiments.
Figure 4B:
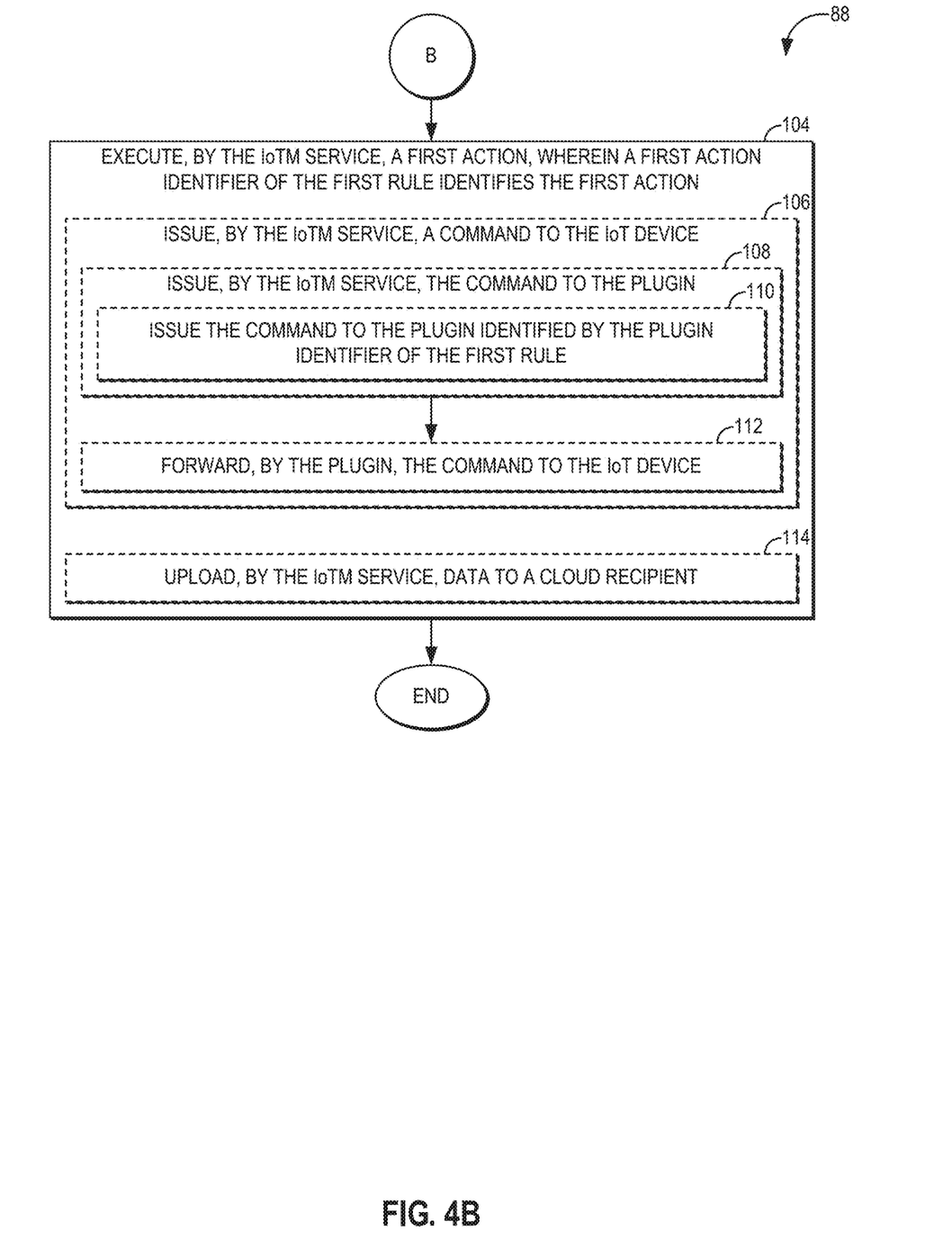

FIGS. 4A and 4B provide a flowchart 88 to illustrate exemplary operations of the network computing device 10 of FIG. 1 for providing event-driven IoT abstraction using rules, in accordance with some embodiments. Elements of FIGS. 1 and 2 are referenced in describing FIGS. 4A and 4B for the sake of clarity. In some embodiments, operations in FIG. 4A begin with the IoTM service 20 of the network computing device 10 receiving the plugin 34 from the plugin provider 36 (block 90). The IoTM service 20 of the network computing device 10 next receives the plurality of rules 22(0)-22(R), wherein the network computing device 10 is communicatively coupled to the IoT device 16, and each rule of the plurality of rules 22(0)-22(R) comprises the event identifier 40(0)-40(R) that identifies an event that the IoT device 16 is capable of emitting, and the action identifier 42(0)-42(R) that identifies an action to be performed by the IoTM service 20 (block 92).

The IoTM service 20 then receives a first event (e.g., the event 18 or "first event 18") emitted by the IoT device 16 (block 94). In some embodiments, the operations of block 94 for receiving the first event 18 may comprise the plugin 34 receiving the first event 18 emitted by the IoT device 16 (block 96). The plugin 34 then sends the first event 18 to the IoTM service 20 (block 98). The IoTM service 20 identifies a first rule (e.g., the rule 22(0) or "first rule 22(0)") of the plurality of rules 22(0)-22(R) based on a first event identifier (e.g., the event identifier 40(0) or "first event identifier 40(0)") of the first rule 22(0) that matches the first event 18 (block 100). Some embodiments may provide that the operations of block 100 for identifying the first rule 22(0) may be further based on a first IoT device filter (e.g., the IoT device filter 46(0)) of the first rule 22(0) that matches an attribute of the IoT device 16 (block 102). Operations then continue at block 104 of FIG. 4B.

Referring now to FIG. 4B, the IoTM service 20 next executes a first action (e.g., the action 24 or "first action 24"), wherein a first action identifier (e.g., the action identifier 42(0) or "first action identifier 42(0)") of the first rule 22(0) identifies the first action 24 (block 104). In some embodiments, the operations of block 104 for executing the first action 24 may comprise the IoTM service 20 issuing a command to the IoT device 16 (block 106). This may be accomplished in some embodiments by the IoTM service 20 issuing the command to the plugin 34 (block 108). Some embodiments may provide that the operations of block 108 for issuing the command to the plugin 34 comprises issuing the command to the plugin 34 identified by a plugin identifier (e.g., the plugin identifier 48(0)) of the first rule 22(0) (block 110). The plugin 34 then forwards the command to the IoT device 16 (block 112). According to some embodiments, the operations of block 104 for executing the first action 24 may comprise the IoTM service 20 uploading data (e.g., the data 26 of FIG. 1) to the cloud recipient 28 (block 114).

Figure 5:
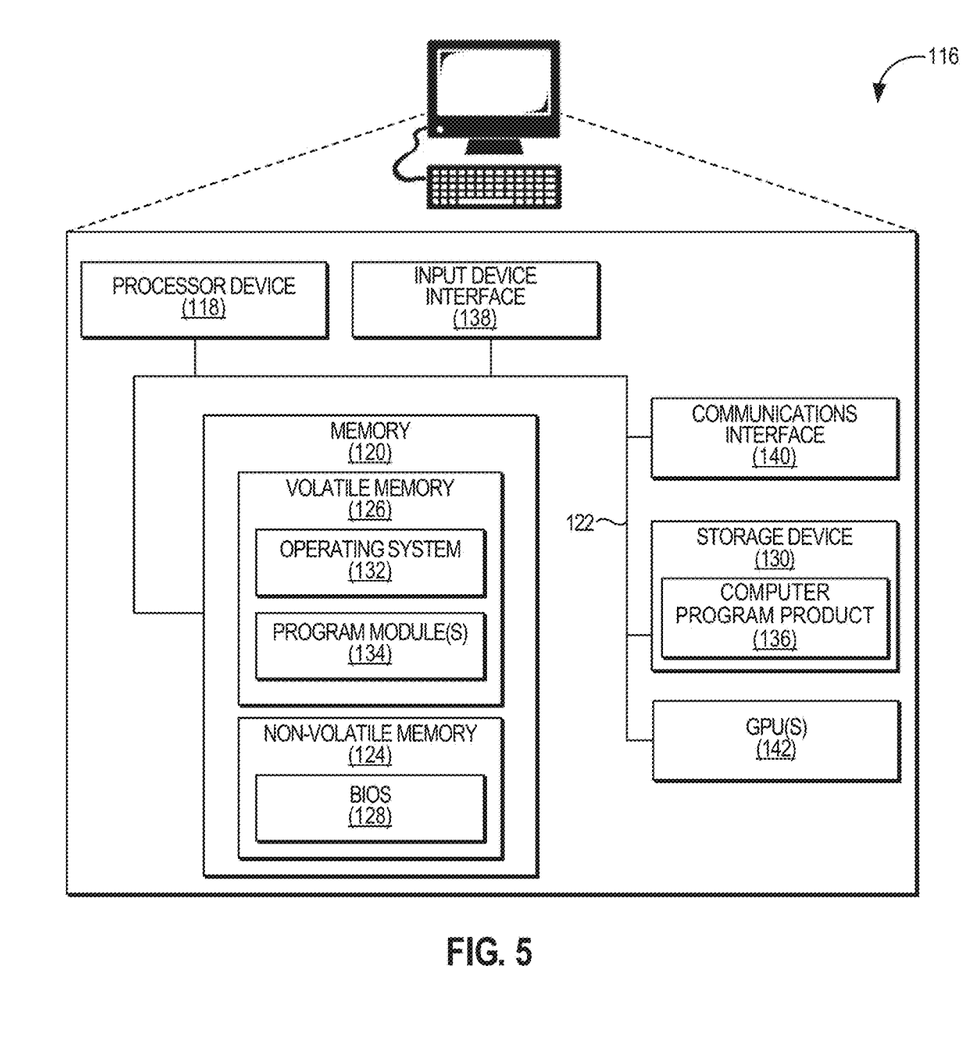
FIG. 5 is a block diagram of a computing device suitable for implementing embodiments disclosed herein.

FIG. 5 is a block diagram of a computing device 116, such as the network computing device 10 of FIG. 1, suitable for implementing examples according to one embodiment. The computing device 116 may comprise any computing or electronic device capable of including firmware, hardware, and/or executing software instructions to implement the functionality described herein, such as a computer server or the like. The computing device 116 includes a processor device 118, a memory 120, and a system bus 122. The system bus 122 provides an interface for system components including, but not limited to, the memory 120 and the processor device 118. The processor device 118 can be any commercially available or proprietary processor.

The system bus 122 may be any of several types of bus structures that may further interconnect to a memory bus (with or without a memory controller), a peripheral bus, and/or a local bus using any of a variety of commercially available bus architectures. The memory 120 may include non-volatile memory 124 (e.g., read-only memory (ROM), erasable programmable read-only memory (EPROM), electrically erasable programmable read-only memory (EEPROM), etc.), and volatile memory 126 (e.g., random-access memory (RAM)). A basic input/output system (BIOS) 128 may be stored in the non-volatile memory 124 and can include the basic routines that help to transfer information between elements within the computing device 116. The volatile memory 126 may also include a high-speed RAM, such as static RAM, for caching data.

The computing device 116 may further include or be coupled to a non-transitory computer-readable storage medium such as a storage device 130, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 130 and other drives associated with computer-readable media and computer-usable media may provide non-volatile storage of data, data structures, computer-executable instructions, and the like.

A number of modules can be stored in the storage device 130 and in the volatile memory 126, including an operating system 132 and one or more program modules 134, which may implement the functionality described herein in whole or in part. All or a portion of the examples disclosed herein may be implemented as a computer program product 136 stored on a transitory or non-transitory computer-usable or computer-readable storage medium, such as the storage device 130, which includes complex programming instructions, such as complex computer-readable program code, to cause the processor device 118 to carry out the steps described herein. Thus, the computer-readable program code can comprise software instructions for implementing the functionality of the examples described herein when executed by the processor device 118. The processor device 118 may serve as a controller, or control system, for the computing device 116 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 118 through an input device interface 138 coupled to the system bus 122 but can be connected through other interfaces such as a parallel port, an Institute of Electrical and Electronic Engineers (IEEE) 1394 serial port, a Universal Serial Bus (USB) port, an infrared (IR) interface, and the like.

The computing device 116 may also include a communications interface 140 suitable for communicating with a network as appropriate or desired. The computing device 116 includes one or more graphic processing units (GPUs) 142.

Those skilled in the art will recognize improvements and modifications to the preferred embodiments of the disclosure. All such improvements and modifications are considered within the scope of the concepts disclosed herein and the claims that follow.

What is claimed is:

1. A method, comprising:
   receiving, by an Internet of Things (IoT) management (IoTM) service of a network computing device, a plurality of rules, wherein:
   the network computing device is communicatively coupled to an IoT device; and
   each rule of the plurality of rules comprises:
   an event identifier that identifies an event that the IoT device is capable of emitting; and
   an action identifier that identifies an action to be performed by the IoTM service;
   receiving, by the IoTM service, a first event emitted by the IoT device;
   identifying a first rule of the plurality of rules based on a first event identifier of the first rule that matches the first event; and
   executing, by the IoTM service, a first action, wherein a first action identifier of the first rule identifies the first action.

2. The method of claim 1, wherein:
   the first action comprises a command to be sent by the IoTM service to the IoT device; and
   executing, by the IoTM service, the first action comprises issuing, by the IoTM service, the command to the IoT device.

3. The method of claim 2, wherein:
the network computing device comprises a plugin that supports a communications protocol for communication with the IoT device;
receiving the first event emitted by the IoT device comprises:
  receiving, by the plugin, the first event emitted by the IoT device; and
  sending, by the plugin, the first event to the IoTM service; and
issuing the command to the IoT device comprises:
  issuing, by the IoTM service, the command to the plugin; and
  forwarding, by the plugin, the command to the IoT device.

4. The method of claim 3, further comprising receiving, by the IoTM service, the plugin from a plugin provider.

5. The method of claim 3, wherein the communications protocol for communication with the IoT device comprises a BLUETOOTH® protocol, a ZIGBEE® protocol, or a Z-WAVE® protocol.

6. The method of claim 3, wherein:
each rule of the plurality of rules further comprises a plugin identifier; and
issuing, by the IoTM service, the command to the plugin comprises issuing the command to the plugin identified by the plugin identifier of the first rule.

7. The method of claim 1, wherein:
the first action identifier of the first rule identifies a data upload command to be executed by the IoTM service;
the first event comprises data generated by the IoT device; and
executing, by the IoTM service, the first action comprises uploading, by the IoTM service, the data to a cloud recipient.

8. The method of claim 1, wherein:
each rule of the plurality of rules further comprises an IoT device filter that indicates an attribute of the IoT device to which the rule applies; and
identifying the first rule of the plurality of rules is further based on a first IoT device filter of the first rule that matches an attribute of the IoT device.

9. A network computing device, comprising:
a system memory; and
a processor device communicatively coupled to the system memory and to an Internet of Things (IoT) device;
the processor device configured to:
  receive, by an IoT management (IoTM) service of the processor device, a plurality of rules, wherein each rule of the plurality of rules comprises:
    an event identifier that identifies an event that the IoT device is capable of emitting; and
    an action identifier that identifies an action to be performed by the IoTM service;
  receive a first event emitted by the IoT device;
  identify a first rule of the plurality of rules based on a first event identifier of the first rule that matches the first event; and
  execute a first action, wherein a first action identifier of the first rule identifies the first action.

10. The network computing device of claim 9, wherein:
the first action comprises a command to be sent by the processor device to the IoT device; and
the processor device is configured to execute the first action by being configured to issue the command to the IoT device.

11. The network computing device of claim 10, wherein:
the network computing device comprises a plugin that supports a communications protocol for communication with the IoT device;
the processor device is configured to receive the first event emitted by the IoT device by being configured to:
  receive, by the plugin, the first event emitted by the IoT device; and
  send, by the plugin, the first event to the IoTM service; and
the processor device is configured to issue the command to the IoT device by being configured to:
  issue, by the IoTM service, the command to the plugin; and
  forward, by the plugin, the command to the IoT device.

12. The network computing device of claim 11, wherein the processor device is further configured to receive the plugin from a plugin provider.

13. The network computing device of claim 11, wherein the communications protocol for communication with the IoT device comprises a BLUETOOTH® protocol, a ZIGBEE® protocol, or a Z-WAVE® protocol.

14. The network computing device of claim 11, wherein:
each rule of the plurality of rules further comprises a plugin identifier; and
the processor device is configured to issue the command to the plugin by being configured to issue the command to the plugin identified by the plugin identifier of the first rule.

15. The network computing device of claim 9, wherein:
the first action identifier of the first rule identifies a data upload command to be executed by the IoTM service of the processor device;
the first event comprises data generated by the IoT device; and
the processor device is configured to execute the first action by being configured to upload the data to a cloud recipient.

16. The network computing device of claim 9, wherein:
each rule of the plurality of rules further comprises an IoT device filter that indicates an attribute of the IoT device to which the rule applies; and
the processor device is configured to identify the first rule of the plurality of rules further based on a first IoT device filter of the first rule that matches an attribute of the IoT device.

17. A non-transitory computer-readable medium having stored thereon computer-executable instructions which, when executed by a processor device, cause the processor device to:
receive, by an Internet of Things (IoT) management (IoTM) service of the processor device, a plurality of rules, wherein each rule of the plurality of rules comprises:
  an event identifier that identifies an event that an IoT device is capable of emitting; and
  an action identifier that identifies an action to be performed by the IoTM service;
receive a first event emitted by the IoT device;
identify a first rule of the plurality of rules based on a first event identifier of the first rule that matches the first event; and
execute a first action, wherein a first action identifier of the first rule identifies the first action.

18. The non-transitory computer-readable medium of claim 17, wherein:
the first action comprises a command to be sent by the processor device to the IoT device; and
the computer-executable instructions cause the processor device to execute the first action by causing the processor device to issue the command to the IoT device.

19. The non-transitory computer-readable medium of claim 18, wherein:
the processor device comprises a plugin that supports a communications protocol for communication with the IoT device;
the computer-executable instructions cause the processor device to receive the first event emitted by the IoT device by causing the processor device to:
receive, by the plugin, the first event emitted by the IoT device; and
send, by the plugin, the first event to the IoTM service; and
the computer-executable instructions cause the processor device to issue the command to the IoT device by causing the processor device to:
issue, by the IoTM service, the command to the plugin; and
forward, by the plugin, the command to the IoT device.

20. The non-transitory computer-readable medium of claim 17, wherein:
the first action identifier of the first rule identifies a data upload command to be executed by the IoTM service;
the first event comprises data generated by the IoT device; and
the computer-executable instructions cause the processor device to execute the first action by causing the processor device to upload the data to a cloud recipient.

* * * * *